(12) United States Patent
Webb

(10) Patent No.: US 11,784,536 B1
(45) Date of Patent: Oct. 10, 2023

(54) METHOD AND APPARATUS FOR COLLECTING THRUST TO GENERATE POWER OR USEFUL ENERGY

(71) Applicant: Daniel Webb, Dahlonega, GA (US)

(72) Inventor: Daniel Webb, Dahlonega, GA (US)

( * ) Notice: Subject to any disclaimer, the term of this patent is extended or adjusted under 35 U.S.C. 154(b) by 0 days.

(21) Appl. No.: 17/864,700

(22) Filed: Jul. 14, 2022

(51) Int. Cl.
*H02K 7/18* (2006.01)
*B64F 1/00* (2006.01)

(52) U.S. Cl.
CPC ............. *H02K 7/1823* (2013.01); *B64F 1/00* (2013.01)

(58) Field of Classification Search
CPC ................................ H02K 7/1823; B64F 1/00
See application file for complete search history.

(56) References Cited

U.S. PATENT DOCUMENTS

| | | | |
|---|---|---|---|
| 8,678,310 B2 | 3/2014 | Masoudipour | |
| 8,882,028 B2 | 11/2014 | Chase | |
| 8,967,530 B2 | 3/2015 | Gatzke | |
| 9,567,096 B2 | 2/2017 | Mora | |
| 9,573,697 B2 | 2/2017 | Criado | |
| 9,957,060 B2 | 5/2018 | Riordan | |
| 2015/0260171 A1* | 9/2015 | Toh | H02K 7/1823 290/52 |
| 2018/0226860 A1* | 8/2018 | Glatfelter | H02K 7/1823 |

OTHER PUBLICATIONS

Vadim Dyakonov, Wind Technologies For Air Travel: Eco-airplane Using Wind Turbines, Kemerovo, Russia.

* cited by examiner

*Primary Examiner* — Joseph Ortega
(74) *Attorney, Agent, or Firm* — KNECHTEL, DEMEUR & SAMLAN

(57) ABSTRACT

A thrust collection device that provides a fixed thrust divider utilizing straight or curvilinear or arcing walls or, alternatively, a functional hatch utilizing rotatable doors, a chamber providing multiple inwardly tapering walls toward an opening into one or more access channels leading or directing, the thrust from an air driven vehicle, engine or machine such as, for example, the jet blast from a departing airplane, jet liner, or helicopter; the downward force from a landing airplane, jet liner, or helicopter; a prop driven engine; or just an engine, or into a power reserve or power generation source device to create power.

10 Claims, 9 Drawing Sheets

Thrust Collector Side View
Fixed Hatch System Plane Departing and Landing

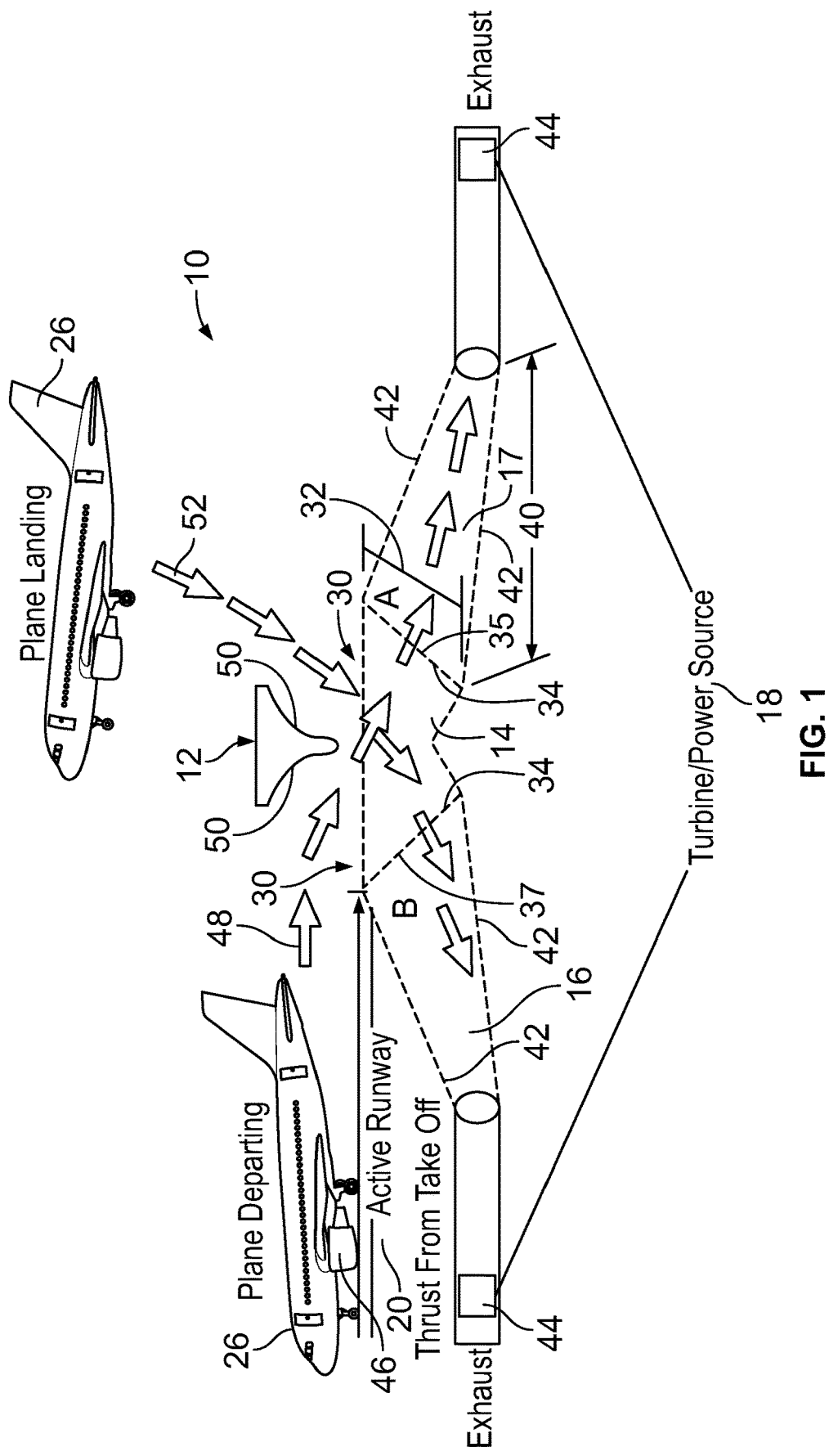

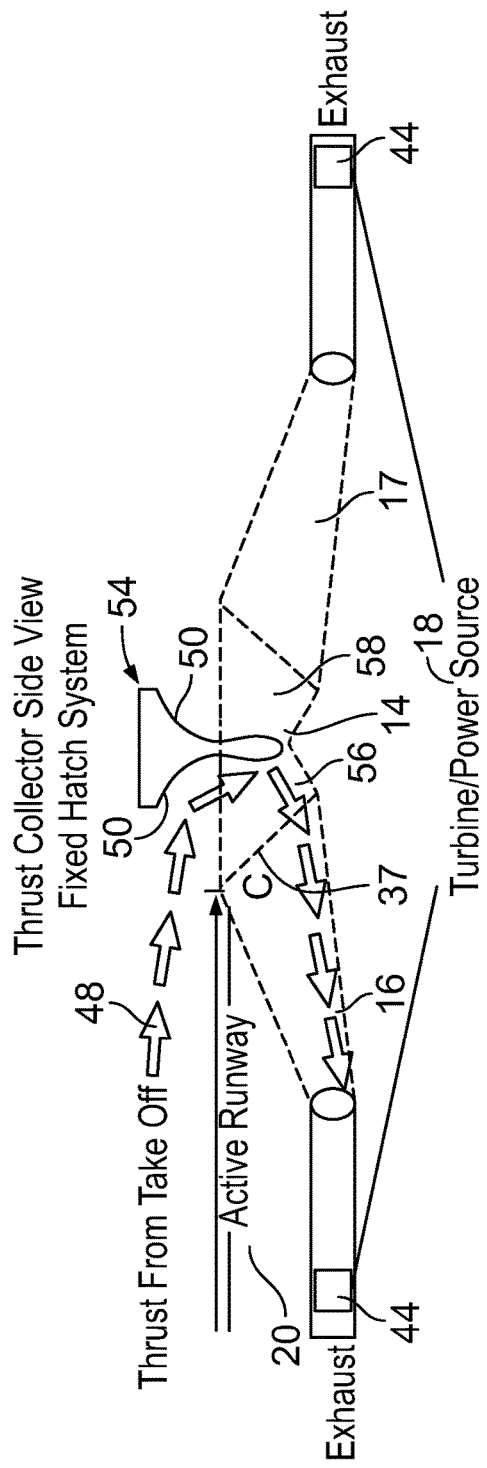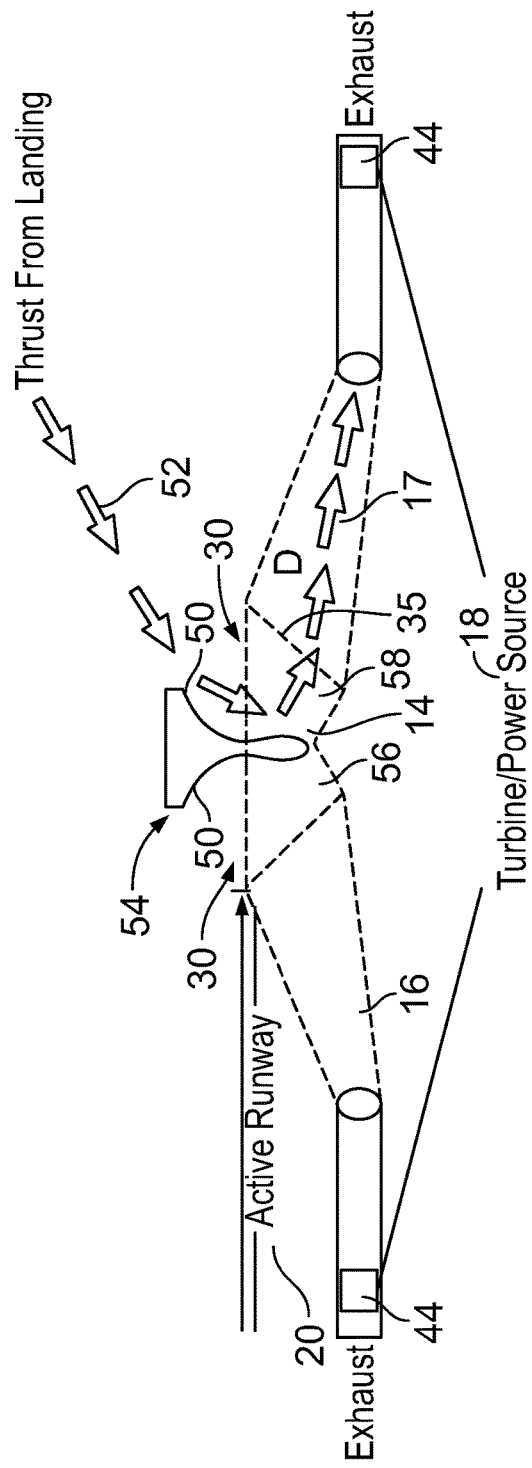

METHOD AND APPARATUS FOR COLLECTING THRUST TO GENERATE POWER OR USEFUL ENERGY

I. FIELD OF THE INVENTION

The present invention relates to a method and apparatus for collecting the thrust from an air driven vehicle, engine or machine that can be used to harness and convert this thrust-generated into power such as power reserves or power generation from this thrust collection device.

II. DESCRIPTION OF THE PRIOR ART

In the prior art, there are many products or processes such as, for example, wind energy and/or wind power, used to generate power or electricity for all kinds of uses such as, for example, grinding grain or pumping water or using these processes to convert this wind energy and/or wind power. Applicant has invented a new, extremely unique, thrust collection device that solves this problem by collecting the thrust from an air driven vehicle, engine or machine that can be used to harness and convert this thrust-generated into such power. Thus, there is a need and there has never been disclosed Applicant's unique thrust collection device.

II, SUMMARY OF THE INVENTION

The present invention is a thrust collection device that provides a fixed thrust divider utilizing straight or curvilinear or arcing walls or, alternatively, a functional hatch utilizing rotatable doors, a chamber providing multiple inwardly tapering walls toward an opening into one or more access channels leading or directing, the thrust from an air driven vehicle, engine or machine such as, for example, the jet blast from a departing airplane, jet liner, or helicopter; the downward force from a landing airplane, jet liner, or helicopter; a prop driven engine; or just an engine, or into a power reserve or power generation source device to create power.

IV, BRIEF DESCRIPTION OF THE DRAWINGS

The Description of the Preferred Embodiment will be better understood with reference to the following figures:

FIG. 1 is a side perspective view of Applicant's collection device invention illustrating, in particular, the fixed thrust divider, the chamber, and access channels leading to the power reserve or generation source or device.

FIG. 2 is a side perspective view of Applicant's collection device invention illustrating, in particular, an alternate fixed thrust divider, the chamber, and access channels leading to the power reserve or generation source or device; as well as the direction of the jet blast from a departing airplane.

FIG. 3 is a side perspective view of Applicant's collection device invention illustrating, in particular, the alternate fixed thrust divider, the chamber, and access channels leading to the power reserve or generation source or device; as well as the direction of the downward force from a landing airplane.

DETAILED DESCRIPTION OF THE PREFERRED EMBODIMENT

Figure 4:
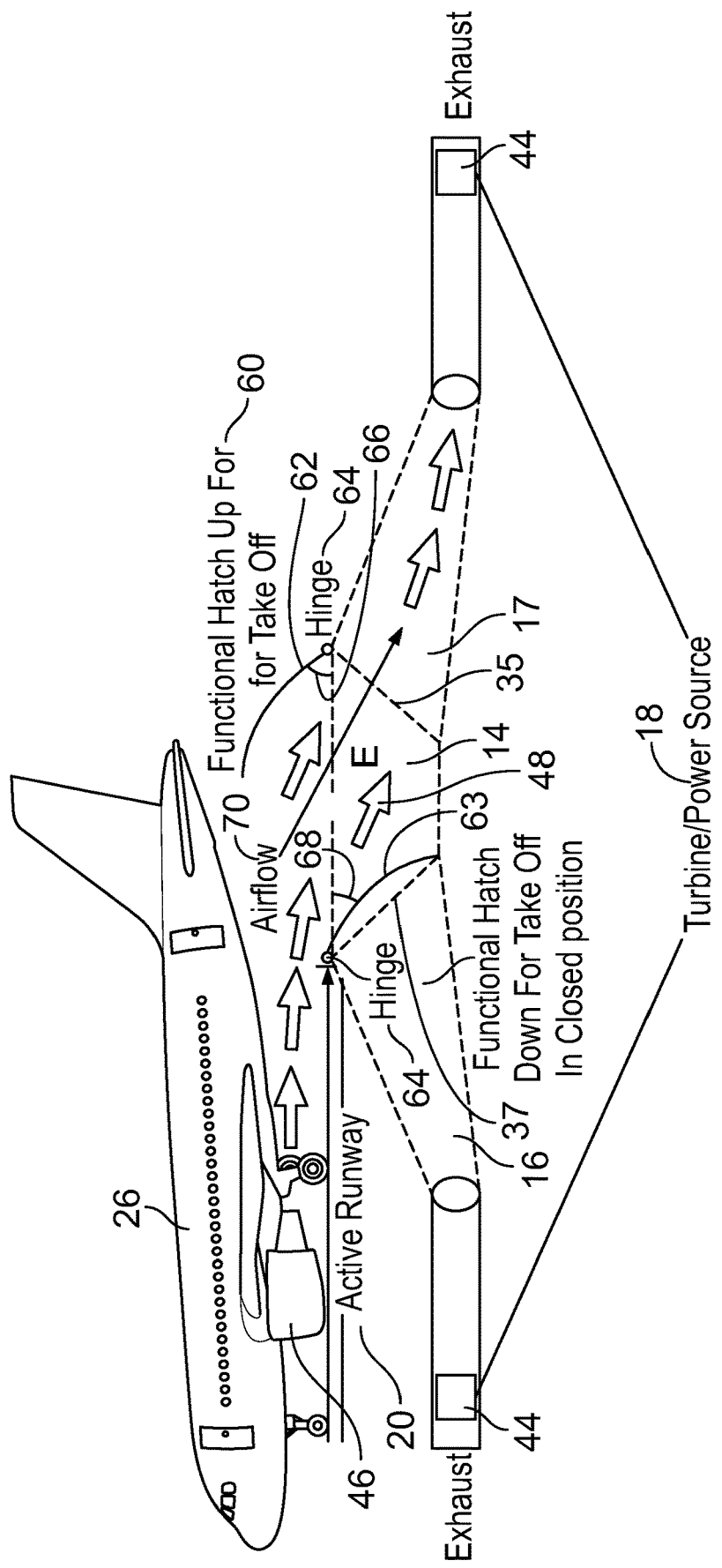
FIG. 4 is a side perspective view of an alternate embodiment of Applicant's collection device illustrating, in particular, an alternate functional hatch, the chamber, and access channels leading to the power reserve or generation source or device; as well as the direction of the jet blast from a departing airplane.

Turning first to FIGS. 1, there is illustrated Applicant's preferred thrust collection device 10. The thrust collection device 10 preferably comprises a fixed thrust divider 12, a chamber 14, and access channels 16 leading to a power reserve or power generation source ("power generation") device 18.

The fixed thrust divider 12 is situated on an airport runway 20 adjacent to an active section 22 (see FIG. 6) of a runway 20. In the preferred embodiment, the fixed thrust divider 12 is located within, and near the edge of, the blast area or displaced threshold 24 (see FIG. 6) to the active section 22 of the runway. In this manner, the fixed thrust divider 12 is in the blast area or displaced threshold 24 at a location that would not interfere with an out-bound (departing) or in-bound (landing) airplane 26 but is closest to the full length takeoff or intersection takeoff locations of the airplane 26 on the active section 22 of the runway 20.

Figure 9:
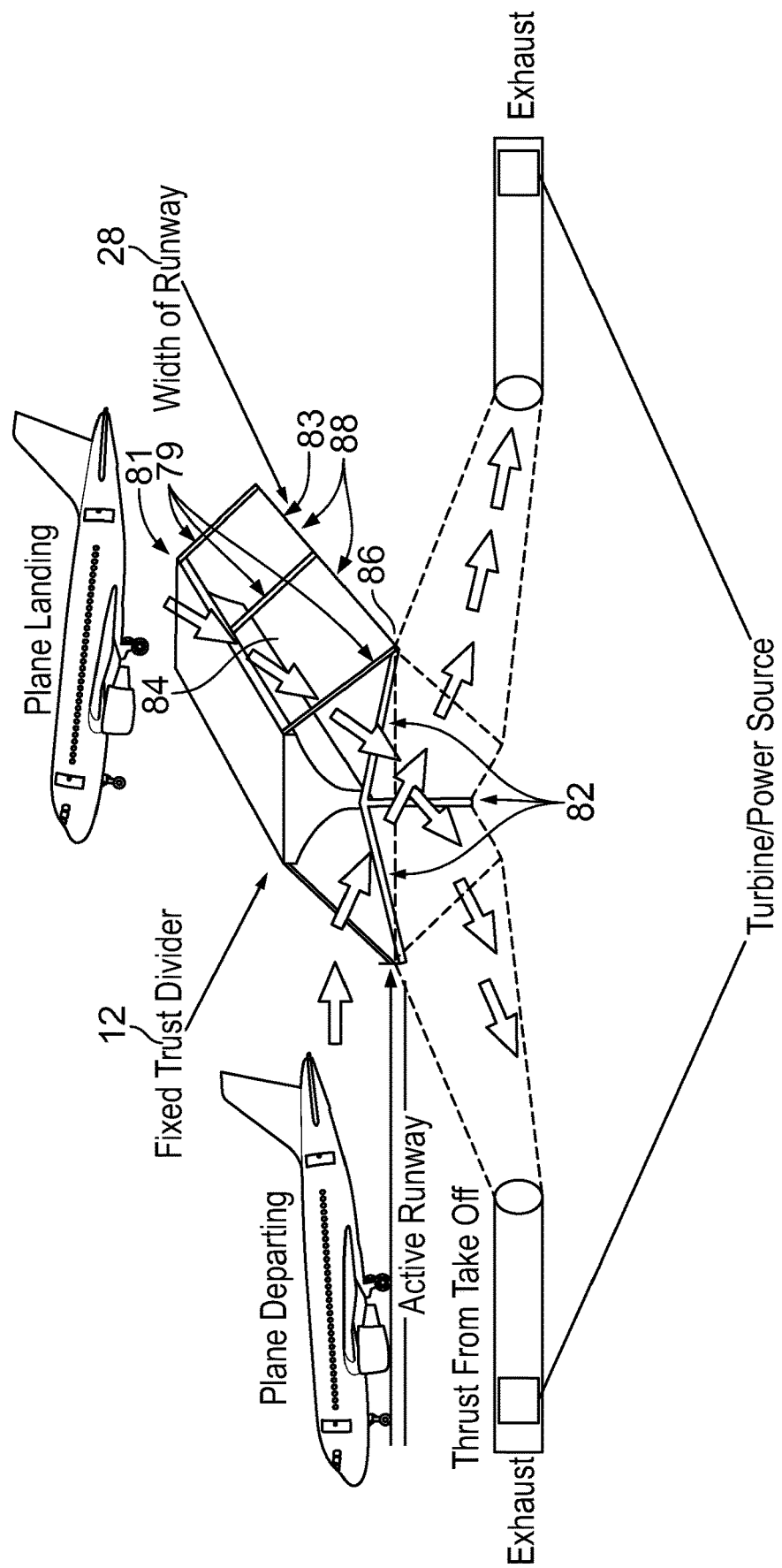
FIG. 9 is a side perspective view of Applicant's collection device invention illustrating, in particular, the attachment of the fixed thrust divider to the chamber.

In the preferred embodiment, the fixed thrust divider 12 is fixedly secured in substantially the center of the chamber 14, as illustrated in FIG. 9. In the non-limiting example, as illustrated, first support legs 79 are attached between the top side 81 of the fixed thrust divider 12 and the exterior sides 83 of the chamber 14 and second support legs 82 attached between the bottom side 84 of the fixed thrust divider 12 and the edges 86 of the chamber 14. Additionally, in all other areas in between the first support legs 79 and second support legs 82 remains open space 88 to allow all of the thrust to flow through (as more fully described herein). Alternatively, the fixed thrust divider 12 may be fixedly secured to the chamber 14 in any manner known to one skilled in the art. In position, the fixed thrust divider 12 is situated in a vertical orientation perpendicular to the length of the runway 20 and extends longitudinally along the entire width 28 (see FIG. 6) of the runway 20. In an alternate embodiment, the fixed thrust divider 12 may extend longitudinally along less than the entire width 28 (see FIG. 6) of the runway 20. Should the fixed thrust divider 12 extend longitudinally along less than the entire width 28 (see FIG. 6) of the runway 20, the fixed thrust divider 12 would preferably be located as directly in line with the jet blast 48 or downward force 52 (discussed in more detail below).

The chamber 14 is an enclosed section that provides an opening 30 in substantial alignment with the horizontal orientation of the runway 20 and extends a distance 32 below the runway 20. The chamber 14 provides chamber tapering walls 34 (see also FIG. 6) to direct the thrust (defined in more detail below) into opening 35 and 37 (see FIGS. 1 and 6) to the access channels 16 and 17. In the preferred embodiment, the chamber tapering walls 34 consists of at least two tapers: a first inward taper along first side walls 36 from the opening 30 toward the opening 35 of the access channels 16; and a second inward taper along second side walls 38 from the opening 30 toward the opening 35 of the access channels 16, which lead to openings 35 and 37. Likewise, in the preferred embodiment, the opening 37 is the exact same but on the opposite side of the chamber 14 as the opening 35.

Figure 6:
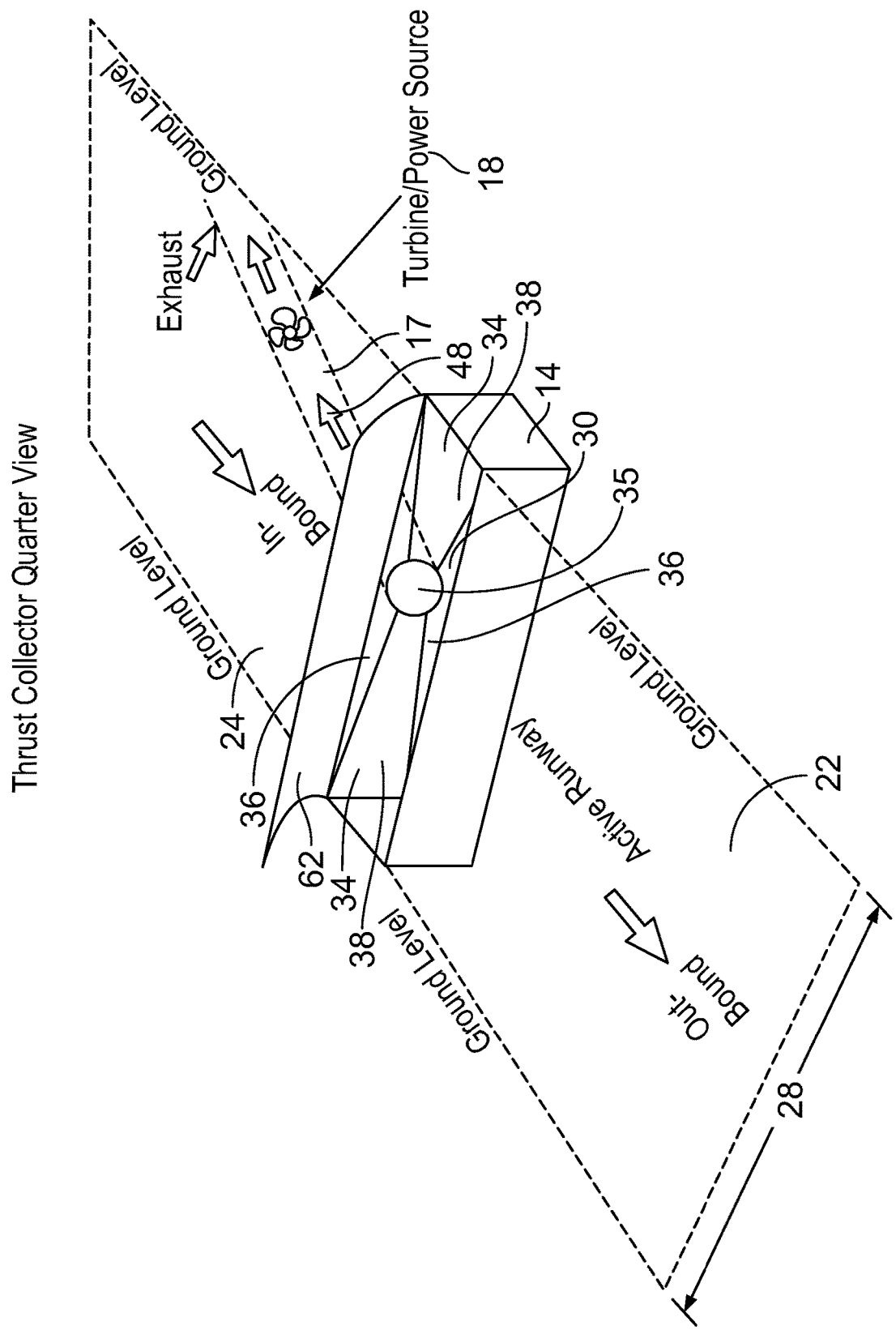
FIG. 6 is a perspective view, with portions removed, of the alternate embodiment of Applicant's collection device illustrating, in particular, in relation to the airport runway.

The access channels 16 and 17 is an enclosed section that is accessible through the opening 37 and 35, respectively, and extends a distance 40 to the power generation device 18 located in the exhaust section 44. In the preferred embodiment, the access channels 16 and 17 provide access channel tapering walls 42 that likewise taper inwardly from the opening 35 toward the power generation device 18. Advantageously, the access channels 16 and 17 may also, alternatively, allow room to house the power generation device 18, as illustrated in FIG. 6, instead of in the exhaust section 44.

The power generation device 18 may be any power reserve or power generation source known to one skilled in the art. In a non-limiting example, the power generation device 18 may be a turbine/power, propeller driven, belt-drive or direct-drive type permanent magnet alternator, a belt-drive or direct-drive type generator, a belt-drive or direct-drive type air motor, or any other means known to one skilled in the art to harness and convert the thrust-generated power received from the thrust collection device 10 into any form of electrical or other power known to one skilled in the art.

In use, Applicant's thrust collection device 10 utilizes the thrust from a departing airplane 26. More specifically, when an airplane 26 is in position on the active section 22 of the runway 20 for a full length takeoff or an intersection takeoff, the throttles of the airplane 26 are advanced to takeoff power. As this occurs, while this is needed for the airplane 26 to takeoff, it also causes the engines 46 of the airplane 26 to generate or produce jet blast 48. In this manner, the jet blast 48 is forced along the runway 20 in the direction behind the airplane 26 and directly into Applicant's thrust collection device 10.

As the jet blast 48 reaches the thrust collection device 10, the jet blast 48 engages the fixed thrust divider 12 which, using a curvilinear or arcing wall 50, forces the jet blast 48 through the opening 30 and into the chamber 14.

As the jet blast 48 enters the chamber 14, the jet blast 48 engages the chamber tapering walls 34 (see also FIG. 6) (i.e., the first inward taper along first side walls 36 and the second inward taper along second side walls 38) and is then forced through the opening 35 (see FIG. 6) and into the access channel 17. As illustrated, the jet blast 48 is forced through the opening 35, in the direction of arrow A, and into the access channel 17. Alternatively, some portion of the jet blast 48 may also be forced through the opening 37, in the direction of arrow B, and into that access channel 16.

As the jet blast 48 enters the access channels 17 and/or both access channels 17 and 16, the jet blast 48 engages the access channel tapering walls 42 (see also FIG. 6) and is then forced into the exhaust section 44 to access the power generation device 18, which is then used to generate power reserve or power generation.

Applicant's thrust collection device 10 also utilizes the thrust from a landing airplane 26. More specifically, when an airplane 26 is in final descent to land on the active section 22 of the runway 20, the throttles are set to the target landing speed for the airplane 26. As the airplane 26, flying at the target landing speed, flies over Applicant's thrust collection device 10, the airplane 26 is generating or causing a downward force 52. In this manner, the downward force 52 is forced directly into Applicant's thrust collection device 10.

As the downward force 52 reaches the thrust collection device 10, the downward force 52 engages the fixed thrust divider 12 which, using a curvilinear or arcing wall 50, forces the downward force 52 through the opening 30 and into the chamber 14.

As the downward force 52 enters the chamber 14, the downward force 52 engages the chamber tapering walls 34 (see also FIG. 6) (i.e., the first inward taper along first side walls 36 and the second inward taper along second side walls 38) and is then forced through the opening 37 and into the access channel 16. As illustrated, the downward force 52 is forced through the opening 37, in the direction of arrow B, and into the access channel 16. Alternatively, some portion of the downward force 52 may also be forced through the opening 35, in the direction of arrow A, and into that access channel 17.

As the downward force 52 enters the access channels 16 and/or both access channels and 17, the downward force 52 engages the access channel tapering walls 42 (see also FIG. 6) and is then forced into the exhaust section 44 to access the power generation device 18, which is then used to generate power reserve or power generation.

The term "thrust", as used herein, is defined to be the jet blast 48 generated or produced from the engines 46 of the airplane 26 during takeoff, the downward force 52 generated or produced from the airplane 26 during landing, as well the jet wash, prop wash, rotor wash 100 produced or generated from any air driven vehicle including without limitation a jet liner, prop airplane, helicopter, etc. . . . or any engine or machine that likewise produces thrust including without limitation a prop driven engine, etc., whether during takeoff, landing, maintenance, or in any other manner as known to one skilled in the art.

Turning to FIGS. 2 and 3, an alternate embodiment of the fixed thrust divider 54 is described. This alternate embodiment of the fixed thrust divider 54 is the same as the fixed thrust divider 12 except that this fixed thrust divider 54 extends into, is fixedly secured in substantially the center, and separates the chamber 14 into two separate chamber sections 56 and 58. Alternatively, the fixed thrust divider 54 may be fixedly secured to the chamber 14 in any manner known to one skilled in the art.

In use, when the jet blast 48 from a departing airplane 26 reaches the thrust collection device 10 of Applicant's thrust collection device 10 using this alternate fixed thrust divider 54, the jet blast 48 engages the fixed thrust divider 54 which, using the curvilinear or arcing wall 50, forces the jet blast 48 through the opening 30 and into the chamber section 56 of the chamber 14.

As the jet blast 48 enters the chamber section 56 of the chamber 14, the jet blast 48 engages the chamber tapering walls 34 (see also FIG. 6) (i.e., the first inward taper along first side walls 36 and the second inward taper along second side walls 38) and is then forced through the opening 37 and into the access channels 16. As illustrated, the jet blast 48 is forced through the opening 37, in the direction of arrow C, and into the access channel 16. In this manner, and due to the separation of the chamber 14 into chamber sections 56 and 58, none of the jet blast 48 should be forced through the opening 35 and into the opposite access channel 17.

As the jet blast 48 enters the access channel 16, the jet blast 48 engages the access channel tapering walls 42 (see also FIG. 6) and is then forced into the exhaust section 44 to access the power generation device 18, which is then used to generate power reserve or power generation.

For a landing airplane 26, when the downward force 52 reaches the thrust collection device 10 of Applicant's thrust collection device 10 using this alternate fixed thrust divider 54, the downward force 52 engages the fixed thrust divider 54 which, using the curvilinear or arcing wall 50, forces the jet blast 48 through the opening 30 and into the chamber section 58 of the chamber 14.

As the downward force 52 enters the chamber section 58 of the chamber 14, the downward force 52 engages the chamber tapering walls 34 (see also FIG. 6) (i.e., the first inward taper along first side walls 36 and the second inward taper along second side walls 38) and is then forced through the opening 35 (see FIG. 6) and into the access channel 17. As illustrated, the downward force 52 is forced through the opening 35, in the direction of arrow D, and into the access channel 17. In this manner, and due to the separation of the chamber 14 into chamber sections 56 and 58, none of the downward force 52 should be forced through the opening 37 and into the opposite access channel 16.

As the downward force 52 enters the access channel 17, the downward force 52 engages the access channel tapering walls 42 (see also FIG. 6) and is then forced into the exhaust section 44 to access the power generation device 18, which is then used to generate power reserve or power generation.

Figure 5:
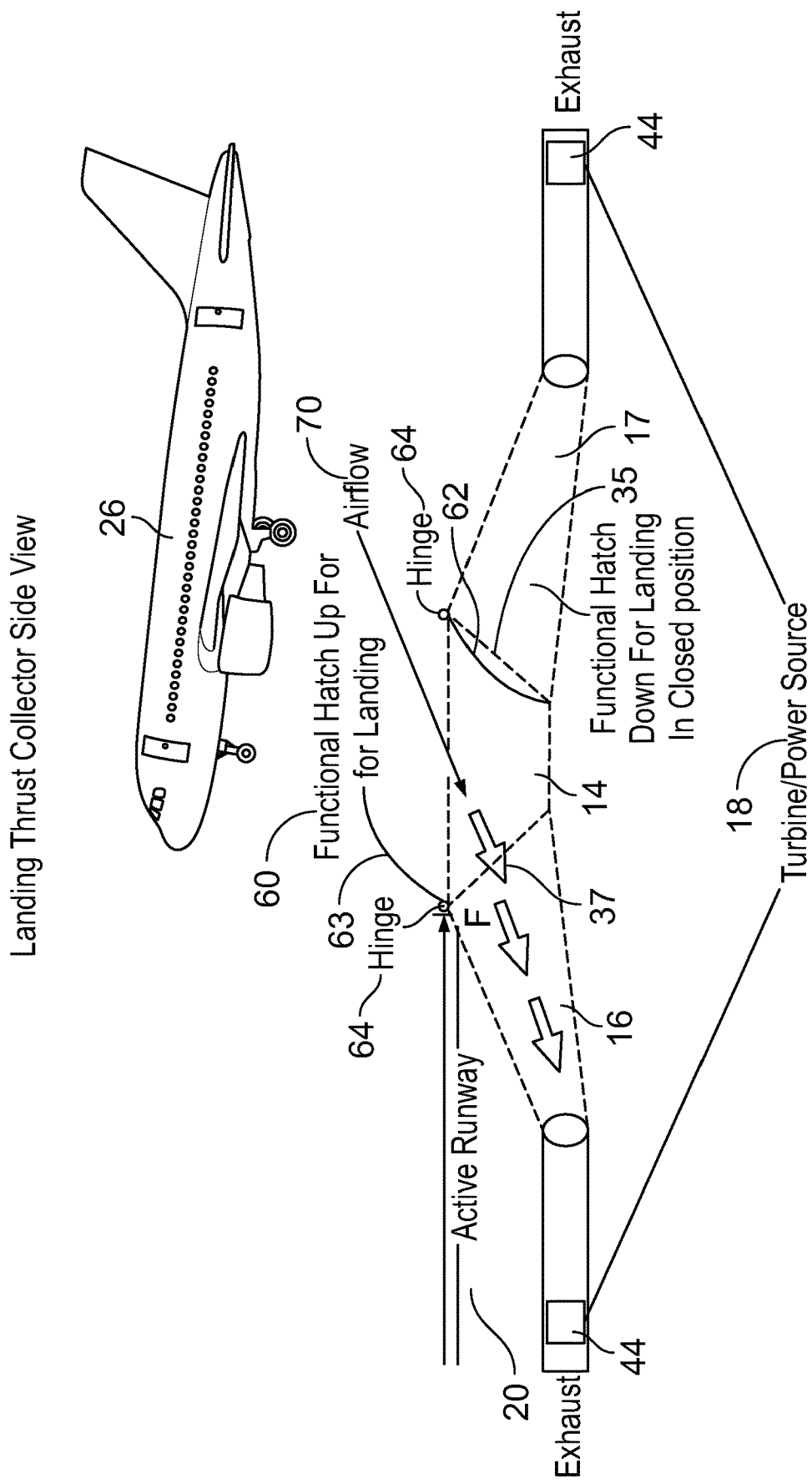
FIG. 5 is a side perspective view of the alternate embodiment of Applicant's collection device invention illustrating, in particular, the alternate functional hatch, the chamber, and access channels leading to the power reserve or generation source or device; as well as the direction of the downward force from a landing airplane.

Turning to FIGS. 4 and 5, an alternate embodiment of Applicant's thrust collection device 10 is described. In this alternate embodiment, while the chamber 14 and access channels 16 leading to a power generation device 18 are the exact same; a functional hatch 60 is provide in lieu of the fixed thrust divider 54. In this manner, the functional hatch 60 comprises doors 62 and 63, with each of the doors 62 and 63 rotatably connected to a hinge 64. The door 62 is also more clearly illustrated in FIG. 6 and the door 63 is the exact same as door 62. In this embodiment, Applicant's thrust collection device 10 is likewise located in the same position (i.e., within, and near the edge of, the blast area or displaced threshold 24 (see FIG. 6) to the active section 22 of the runway). The doors 62 and 63 are preferably situated at the opposite sides of the chamber 14, with the location of the hinge 64 being in substantially the horizontal plane of the length of the runway 20.

Figure 8:
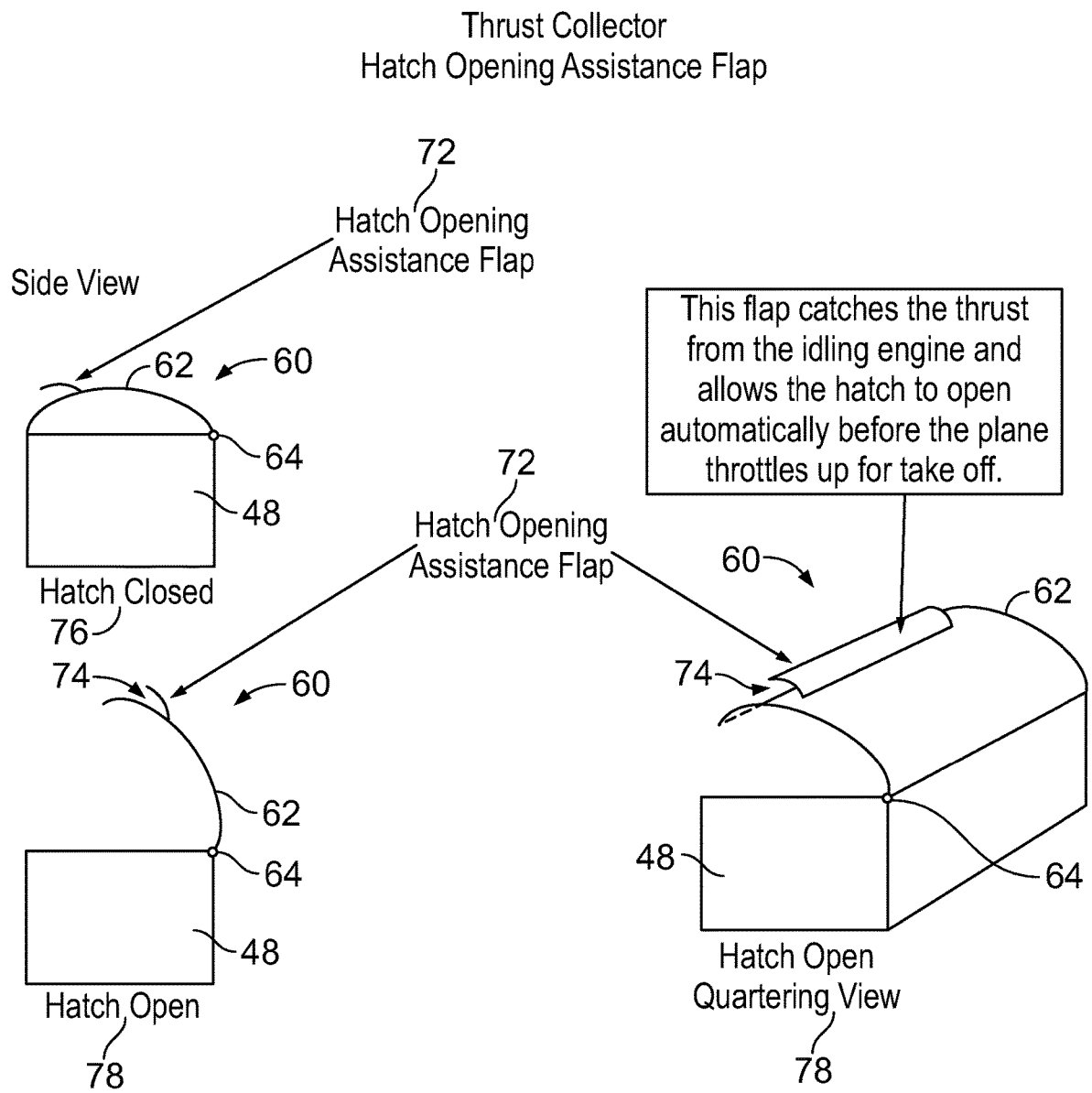
FIG. 8 is a side and perspective view, with portions removed, of an alternate embodiment to the functional hatch of Applicant's collection device illustrating, in particular, a hatch opening assistance flap.

Additionally, the door 62 may further include a hatch opening assistance flap 72, as illustrated in FIG. 8. Preferably, the flap 72 extends longitudinally along the exterior of the door 62 and having a curvilinear arc 74 that extends upwardly from the exterior of the door 62 such that the flap 72 is facing in the same direction as the door 62. In this manner, the flap 72 is likewise in position to utilize the thrust to assist the functional hatch 60. For example, when the functional hatch 60 is in a closed position 76, the initial thrust or idling blast will engage the curvilinear arch 74 causing an uplifting or raising of the door 62. As the thrust continues, the door 62 is opened into an open position 78 for use as described in further below. In this embodiment, the flap 72 will cause the door 62 to open into the open position 78 before the jet blast 48 engages the functional hatch 60 as described more fully below. Furthermore, the hatch opening assistance flap 72 additionally eliminates any obstruction at the beginning of the runway, for example, for landing airplanes.

In use, when the jet blast 48 from a departing airplane 26 reaches the thrust collection device 10 of Applicant's thrust collection device 10 using this alternate functional hatch 60, the door 62 is rotated about the hinge 64 in the upward direction extending outwardly or above the chamber 14 to an angled position 66 relative to the horizontal plane of the length of the runway 20. Preferably, this angled position 66 is substantially forty-five(45)degrees, although this angled position 66 may be greater or lower provided that it accomplishes the function as described herein. The door 63 is likewise rotated about the hinge 64 in the downward direction extending into or within the chamber 14 to an angled position 68 relative to the horizontal plane of the length of the runway 20. Preferably, this angled position 68 is the exact same as the angled position 66 for door 62, although this angled position 68 may be greater or lower and/or different than the angled position 66 provided that it accomplishes the function as described herein.

As the jet blast 48 engages the function hatch 60, and as illustrated in FIG. 4, with the door 62 in the upward direction extending outwardly or above the chamber 14 and the door 63 in the downward direction extending into or within the chamber 14, this creates a directional flow 70 forcing the jet blast 48 into the chamber 14 toward the opening 35, in the direction of arrow E, and into the access channel 17, and then proceeding in the same manner as described above.

For a landing airplane 26, and as illustrated in FIG. 5, when the downward force 52 engages the function hatch 60, with the door 62 in the downward direction extending into or within the chamber 14 and the door 63 in the upward direction extending outwardly or above the chamber 14, this creates a directional flow 70 forcing the downward force 52 into the chamber 14 toward the opening 37, in the direction of arrow F, and into the access channel 16, and then proceeding in the same manner as described above.

Figure 7:
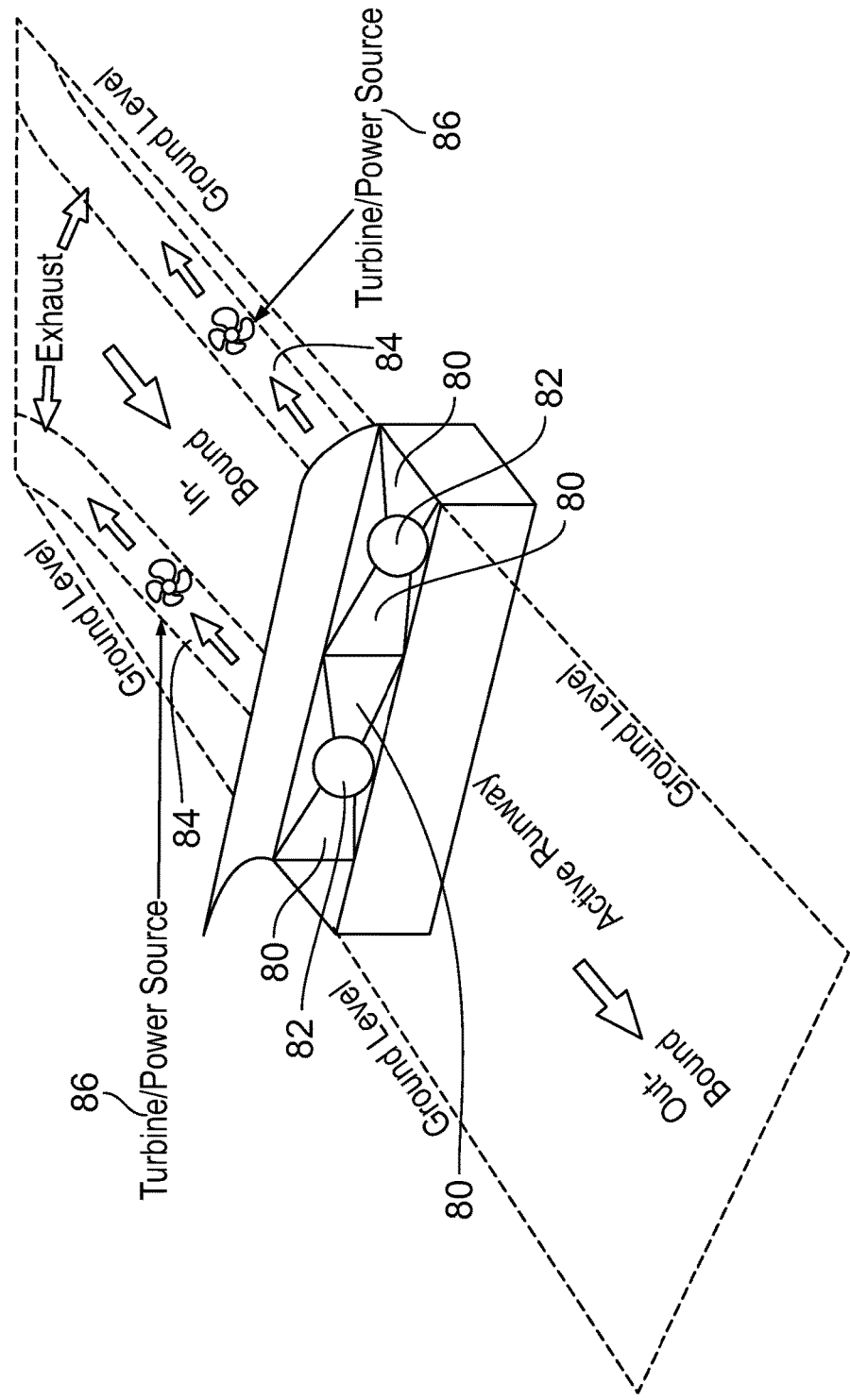
FIG. 7 is a perspective view, with portions removed, of a second alternate embodiment of Applicant's collection device illustrating, in particular, in relation to the airport runway.

In an alternate embodiment, as illustrated in FIG. 7, the chamber 14 may be have a plurality of chamber tapering walls 80 leading to a plurality of openings 82 leading into a plurality of access channels 84 having a plurality of power generation devices 86.

Figure 10:
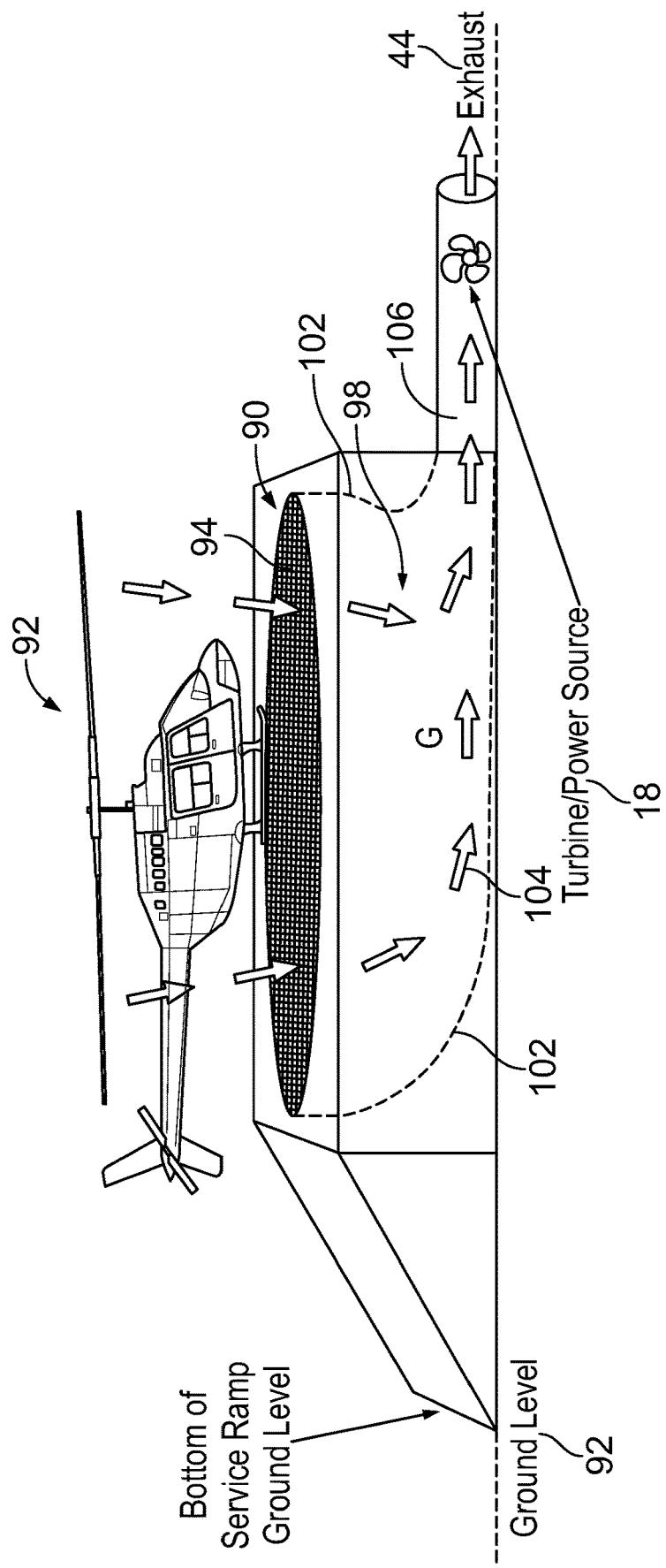
FIG. 10 is a side perspective view of another alternate embodiment of Applicant's collection device invention illustrating, in particular, the alternate raised mezzanine over ground level leading to an open subfloor level to direct the rotor wash into the power reserve or generation source or device.

Turning to FIG. 10, another alternate embodiment of Applicant's thrust collection device 10 is described. In this alternate embodiment, a raised mezzanine 90 over ground level 92 is provided. The raised mezzanine 90 is structurally sound to support the weight of a helicopter 96 while providing a plurality of openings or holes 94 which lead to an open subfloor level 98 that then further leads to the power generation device 18 or through access channels 16 to the power generation device 18.

In use, the rotor wash 100 from a departing or landing helicopter 92 creates a directional flow 104 that proceeds through the plurality of openings or holes 94 of the raised mezzanine 90 and into the subfloor level 98. In the preferred embodiment, and for maximum rotor wash 100, the helicopter 92 should be positioned in the center of the raised mezzanine 90. As the rotor wash 100 enters into the subfloor level 98, the rotor wash 100 engages the directional walls 102 of the subfloor level 98. These directional walls 122 force the directional flow 104 of the rotor wash 100 to proceed further, in the direction of arrow G, and into the access channel 106 and then into the power generation device 18.

Although the illustrations of Applicant's invention and use are discussed above in relation to the thrust from a departing or landing airplane or helicopter, these are non-limiting examples as Applicant's thrust collection device 10 may also be used in connection with the thrust from: any air driven vehicle including without limitation a jet liner, prop airplane, helicopter, etc. . . . or any engine or machine that likewise produces thrust including without limitation a prop driven engine, etc . . . , collectively referred to herein as "thrust generator".

Thus, there has been provided a method and apparatus for collecting the thrust from a departing or landing airplane that can be used to harness and convert this thrust-generated into power reserves or power generation from this thrust collection device. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. An apparatus to collect thrust from an airplane, comprising:
    a fixed thrust divider providing a front side and a back side, the front side formed into a first curvilinear wall and the back side formed into a second curvilinear wall with the first curvilinear wall and the second curvilinear wall each facing in the opposite directions;
    a chamber supporting the fixed thrust divider and providing a first opening and a chamber tapering wall leading to a second opening;
    an access channel supporting the chamber and extending a distance to a power generation device;
    wherein the first curvilinear wall of the front side situated behind the airplane departing from an active section of the runway with the thrust from an engine of the airplane being directed behind the airplane along a thrust plane and into the first curvilinear wall,
    and the second curvilinear wall of the back side situated in front of the airplane landing on the active section of the runway with the thrust from the airplane being directed from the airplane and into the second curvilinear wall,
    with the thrust from the front side or the thrust from the back side being directed through an open space and into the first opening into the chamber, the chamber tapering wall directing the thrust through the chamber and the second opening and into the access channel, and the access channel directing the thrust into the power generation device.

2. The apparatus of claim 1 wherein the fixed thrust divider is situated on the airport runway perpendicular to the active section of the runway.

3. The apparatus of claim 1 wherein the fixed thrust divider is positioned on the runway in a location that would not interfere with an airplane.

4. The apparatus of claim 1 wherein the runway defines a length and a width with the fixed thrust divider extending longitudinally along a portion of the width of the runway.

5. The apparatus of claim 1 wherein the chamber extends a distance below the runway.

6. The apparatus of claim 1 wherein the open space is situated in the thrust plane of the runway and provided on both the front side and the back side by the fixed thrust divider.

7. The apparatus of claim 1 wherein the chamber extends a distance below the runway.

8. The apparatus of claim 1 wherein the chamber further comprising a second chamber tapering wall leading to a third opening.

9. The apparatus of claim 8 and further comprising a second access channel supporting the chamber and extending a second distance to a second power generation device.

10. An apparatus to collect thrust from an airplane, comprising:
    a fixed thrust divider providing a front side formed into a curvilinear wall;
    a chamber supporting the fixed thrust divider and providing a first opening and a chamber tapering wall leading to a second opening;
    an access channel supporting the chamber and extending a distance to a power generation device;
    wherein the curvilinear wall of the front side situated behind the airplane with the thrust from an engine of the airplane being directed behind the airplane along a thrust plane and into the curvilinear wall, with the thrust from the front side being directed through an open space and into the first opening into the chamber, the chamber tapering wall directing the thrust through the chamber and the second opening and into the access channel, and the access channel directing the thrust into the power generation device.

\* \* \* \* \*